US007136851B2

(12) United States Patent
Ma et al.

(10) Patent No.: US 7,136,851 B2
(45) Date of Patent: Nov. 14, 2006

(54) METHOD AND SYSTEM FOR INDEXING AND SEARCHING DATABASES

(75) Inventors: Wei-Ying Ma, Beijing (CN); Ji-Rong Wen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 329 days.

(21) Appl. No.: 10/846,776

(22) Filed: May 14, 2004

(65) Prior Publication Data

US 2005/0256865 A1    Nov. 17, 2005

(51) Int. Cl.
G06F 17/30    (2006.01)
(52) U.S. Cl. .................................. 707/4; 707/3; 707/5
(58) Field of Classification Search .................... 707/2, 707/3, 5, 4
See application file for complete search history.

(56) References Cited

U.S. PATENT DOCUMENTS

| | | | | |
|---|---|---|---|---|
| 5,548,770 | A * | 8/1996 | Bridges | 707/2 |
| 5,999,928 | A * | 12/1999 | Yan | 707/6 |
| 7,020,679 | B1 * | 3/2006 | Tian | 709/201 |
| 2002/0077968 | A1 * | 6/2002 | Kaniwa et al. | 705/38 |
| 2003/0177111 | A1 * | 9/2003 | Egendorf et al. | 707/3 |
| 2003/0212737 | A1 * | 11/2003 | Moricz et al. | 709/202 |

OTHER PUBLICATIONS

Arasu, Arvind and Hector Garcia-Molina, "Extracting Structured Data from Web Pages," SIGMOD San Diego, ACM, Jun. 9-12, 2003.
Bergman, Michael K., "The Deep Web: Surfacing Hidden Value," Journal of Electronic Publishing, University of Michigan Press, Jul. 2001.
Callan, Jamie, Margaret Connell and Aiqun Du, "Automatic Discovery of Language Models for Text Databases," SIGMOD, Philadelphia, ACM 1999.
Chang, Chia-Hui and Shao-Chen Lui, "IEPAD: Information Extraction Based on Pattern Discovery," WWW Hong Kong, ACM May 1-5, 2001.
Chang, Kevin Chen-Chuan, Bin He, Chengkai Li, Mitesh Patel and Zhen Zhang, "Structured Databases on the Web: Observations and Implications," Technical Report UIUCCDCS-R-2003-2321, CS Department, University of Illinois at Urbana-Champaign, Feb. 2003.
Crescenzi, Valter, Giansalvatore Mecca and Paolo Merialdo, "RoadRunner: Towards Automatic Data Extraction from Large Web Sites," Proceedings of the 27th VLDB Conference, Italy, 2001.
Florescu, Daniela, Alon Levy and Alberto Mendelzon, "Database Techniques for the World-Wide Web: A Survey," SIGMOD, 1998.

(Continued)

Primary Examiner—David Bruce
Assistant Examiner—Aaron J. Sanders
(74) Attorney, Agent, or Firm—Perkins Coie LLP

(57) ABSTRACT

A search system generates an index for databases by generatively sampling the databases and uses that index to identify and formulate queries for searching the databases. The generated index is referred to as a domain-attribute index and contains a domain-level index and site-level indexes. A site-level index for a database maps site attributes to distinct attribute values within the database. The domain-level index for a domain maps attribute values to database and site attribute pairs that contain those attribute values. To generate a site-level index for a database within a certain domain, the search system starts out with an initial set of the sample data for that domain. The search system generates sampling queries based on the sample data and submits the sampling queries to a database. The search system updates the site-level index based on the sampling results and uses the results to generate more sampling queries.

27 Claims, 10 Drawing Sheets

OTHER PUBLICATIONS

He, Bin and Kevin Chen-Chuan Chang, "Statistical Schema Matching across Web Query Interfaces," SIGMOD, San Diego, CA, ACM Jun. 9-12, 2003.

He, Hai, Weiyi Meng, Clement Yu, and Zonghuan Wu, "WISE-Integrator. An Automatic Integrator of Web Search Interfaces for E-Commerce," Proceedings of th 29th VLDB Conference, Germany, 2003.

Cho, Junghoo and Hector Garcia-Molina, "Synchronizing a database to Improve Freshness."

SIGMOD Conference, Oct. 25, 1999.

Wang, Jiying and Frederick H. Lochovsky, "Wrapper Induction based on nested Pattern Discovery," Technical Report HKUST-CS-27-02, Department of Computer Science, Hong Kong University of Science & Technology, 2002.

Ipeirotis, Panagiotis G. et al., " Probe, Count, and Classify: Categorizing Hidden-Web Databases," ACM SIGMOD May 21-24, 2001, Santa Barbara, California, Copyright 2001 (12 pages).

Wang, Jiying and Lochovsky, Fred, H., "Data Extraction and Label Assignment for Web Databases," May 20-24, 2003, Budapest, Hungary (18 pages) http://www2003.org/cdrom/papers/refereed/p470/470-wang.htm.

Gravano, Luis and Panagiotis, Ipeirotis, G., "Qprober: A System for Automatic Classification of Hidden-Web Databases," ACM Transactions on Information Systems, vol. 21, No. 1, Jan. 2003 (pp. 1-41).

Meng, Weiyi et al., "Building Efficient and Effective Metasearch Engines," ACM Computing Surveys, vol. 34, No. 1, Mar. 2002 (42 pages).

Meng, Weiyi et al., "A Highly Scalable and Effective Method for Metasearch," ACM Transations on Information Systems, vol. 19, No. 3, Jul. 2001 (26 pages).

Kossman, Donald, "The State of the Art in Distributed Query Processing," ACM Computing Surveys, vol. 32, No. 4, Dec. 2000 (48 pages).

Ipeirotis, Panagiotis, G., "Distributed Search Over the Hidden Web: Hierarchical Database Sampling and Selection," Proceedings of the 28th VLDB Conference, Hong Kong, China, 2002 (12 pages).

Raghavan, Snram and Garcia-Molina, Hector, "Crawling the Hidden Web," Proceedings of the 27th VLDB Conference, Rome, Italy, 2001 (10 pages).

* cited by examiner

Correspondence Table

| | DA | DB$_1$ | DB$_2$ | |
|---|---|---|---|---|
| | author | author | author | |
| | format | type | format | |
| | ISBN | ISBN | ISBN | |
| | ⋮ | | | ... |

Site level DA-Index

Attribute Value Index

| local attribute | value1/freq | value2/freq | | 300 |
|---|---|---|---|---|
| author | Rowling/5 | Tolkien/7 | ... | |
| title | Sorcerer/50 | Ring/20 | Tolkien/5 | |
| publisher | Houghton/2000 | | | |
| | | | | |
| | ⋮ | | | |

*FIG. 3*

Global-level DA-Index  Value Attribute Index

| value | DB/att | DB/att | ... | | 400 |
|---|---|---|---|---|---|
| Tolkien | 1/title | 1/author | 2/title | | |
| Houghton | 1/publisher | 2/publisher | 2/author | 2/title | |
| ⋮ | | | | | |

401 → Tolkien row
402 → Houghton row

FIG. 4

METHOD AND SYSTEM FOR INDEXING AND SEARCHING DATABASES

TECHNICAL FIELD

The described technology relates generally to searching of databases and particularly to searching of web databases.

BACKGROUND

The World Wide Web ("web") provides a vast amount of information that is accessible via web pages. Web pages can contain either static content or dynamic content. Static content refers generally to information that may stay the same across many accesses of a web page. Dynamic content refers generally to information that is stored in a web database and is added to a web page in response to a search request. Dynamic content represents what has been referred to as the deep web or hidden web.

Many search engine services allow users to search for static content of the web. After a user submits a search request or query that includes search terms, the search engine service identifies web pages that may be related to those search terms. These web pages are the search result. To quickly identify related web pages, the search engine services may maintain a mapping of keywords to web pages. This mapping may be generated by "crawling" the web to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on.

These search engine services, however, do not in general provide for searching of dynamic content, which is also considered noncrawlable content. One problem with searching of dynamic content is that the content of the web databases cannot be effectively retrieved and indexed for several reasons. One reason is that the content of multiple web databases may be too large to retrieve and index. Another reason is that the schema of web databases are hidden behind the search interface, that is, only the attributes of the search web page (and result web page) are exposed to a user. Another problem with searching of dynamic content is that the generated index would need to support both unstructured and structured queries. An unstructured query is a list of search terms that are generally used when searching for documents. For example, an unstructured query may be "Harry Potter Rowling." A structured query is a list of attributes and attribute values that are generally used when searching a database. For example, a structured query may be "title=Harry Potter and author=Rowling."

Considerable research has been conducted into developing a "metasearcher" that provides searching across multiple web databases. When the metasearcher receives a query, it selects the web databases that most likely contain relevant content, referred to as "source selection." The metasearcher then translates the query into a suitable format for each of the identified web databases, referred to as "query translation." For example, the metasearcher would need to understand how to map the attributes of the metasearcher's queries into site attributes of each selected web database. For example, the metasearcher may use an attribute named "format" to refer to the medium (e.g., paperback or hardback) of a book, whereas a web database may use an attribute named "type" to refer to the same data. Query translation needs to map the format attribute of the metasearcher to the type attribute of the web database. The metasearcher sends the translated queries to the selected web databases, referred to as "dispatching." When the metasearcher receives the results of the searches, it integrates them into an overall result, referred to as "result integration."

It would be desirable to have a technique for efficiently generating indexes for web databases that would allow for effective searching using both unstructured and structured queries.

SUMMARY

A method and system for indexing and searching web databases within a domain is provided. In one embodiment, a search system generates an index for web databases by generatively sampling the databases and uses that index to identify and formulate queries for searching the databases. The generated index is referred to as a domain-attribute index and contains a domain-level index and, for each database, a site-level index. A site-level index for a database maps site attributes to distinct attribute values within the database. The domain-level index for a domain maps attribute values to database and site attribute pairs that contain those attribute values. To generate a site-level index for a database within a certain domain, the search system starts out with an initial set of the sample data for that domain. The search system selects a site attribute of the database that corresponds to a domain attribute using the domain-to-site mapping. The search system selects an attribute value from the sample data for that domain attribute. The search system then generates and submits a sampling query to the database to search for entries that match the selected attribute value in the selected site attribute. Upon receiving the entries as the query result, the search system generates the site-level index for that database, which maps site attributes to distinct attribute values contained within those site attributes. The search system may generate the domain-level index from the various site-level indexes.

In one embodiment, the search system allows users to specify unstructured queries or structured queries when searching multiple databases. The search system maps an unstructured query to a series of structured queries by first identifying whether the terms of the unstructured query represent an attribute or an attribute value based on the domain-level index. After identifying the set of attribute terms and attribute value terms, the search system generates a query for each combination of attribute term and attribute value term. The search system can use the attribute and attribute value pairs of a structured query directly without having to perform a mapping that is similar to that used for unstructured queries. The search system uses the domain-level index to identify to which databases the queries should be submitted.

BRIEF DESCRIPTION OF THE DRAWINGS

FIG. 2 illustrates a correspondence table in one embodiment.

FIG. 3 illustrates a site-level index for the domain-attribute index in one embodiment.

FIG. 4 illustrates a domain-level index for the domain-attribute index in one embodiment.

DETAILED DESCRIPTION

Figure 1:
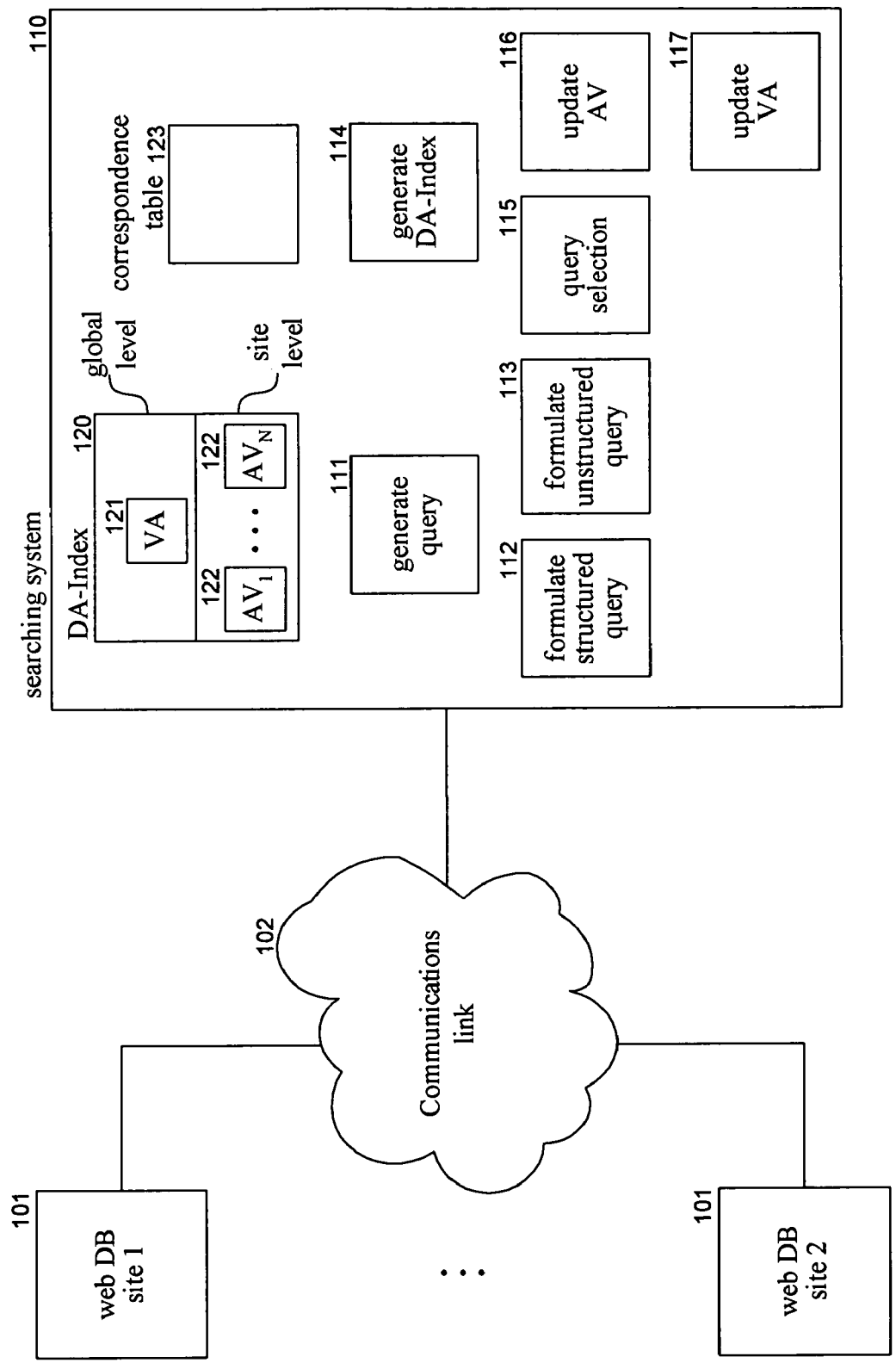
FIG. 1 is a block diagram that illustrates components of the search system in one embodiment.

A method and system for indexing and searching web databases is provided. In one embodiment, a search system generates an index for web databases by generatively sampling the databases and uses that index to identify and formulate queries for searching the databases. The generated index is referred to as a domain-attribute index and contains a domain-level index and, for each database, a site-level index. A domain is a collection of databases directed to a particular topic (e.g., books or cars). Each domain has a domain schema (also referred to as a "global schema") that defines a set of domain attributes that are generally found in the schemas of the databases of the domain. For example, when the domain relates to books, the domain schema may include an author attribute and a title attribute since most book databases would have those attributes. A site-level index for a database maps site attributes to distinct attribute values within the database. For example, if the database contains an entry with an author attribute that has the attribute value of Tolkien, then the site-level index maps the author attribute to Tolkien. The search system generates the site-level indexes by sampling the databases as described below. The domain-level index maps attribute values to database and site attribute pairs that contain those attribute values. For example, a domain-level index would include an entry for the attribute value of Tolkien that is mapped to a database that contains an entry for a Tolkien book and to the author attribute of that database. The search system may generate the domain-level index from the site-level indexes. The domain-level index is a merged and inverted form of the site-level indexes. To process a query, the search system uses the domain-attribute index to select which databases should be searched and uses a domain-to-site attribute mapping to translate the query into a query that is appropriate for each selected database. The search system then submits the translated queries to the selected databases. The search system then integrates the results of the queries using the domain-to-site attribute mapping to map the results from site attributes to the domain attributes.

To generate a site-level index for a database within a certain domain, the search system starts out with an initial set of the sample data for that domain. The sample data provides sample entries for databases within the domain. The entries provide attribute values for the domain attributes of the domain schema. For example, sample data within a domain of books may contain one entry with the title attribute set to "Harry Potter and the Order of the Phoenix" and with the author attribute set to Rowling and another entry with the title attribute set to "The Fellowship of the Ring" and with the author attribute set to Tolkien. To sample a database, the search system selects a site attribute of the database that corresponds to a domain attribute using the domain-to-site mapping. The search system selects an attribute value from the sample data for that domain attribute. The search system then generates and submits a sampling query to the database to search for entries that match the selected attribute value in the selected site attribute. For example, if the selected site attribute is author and the selected attribute value is Tolkien, then the query will search for entries for books written by Tolkien. Upon receiving the entries as the query result, the search system generates the site-level index for that database, which maps site attributes to distinct attribute values contained within those site attributes. For example, the result may include an entry for Tolkien's book "Silmarillion" published by Del Rey, an entry for Tolkien's book "Roverandom" published by Houghton Mifflin, and an entry for Tolkien's book "The Hobbit" published by Houghton Mifflin. If so, then the site-level index will map the title site attribute to the words Silmarillion, Roverandom, and Hobbit and the publisher site attribute to the words of Del, Rey, Houghton, and Mifflin. The search system may also track the number of times that each attribute value occurs within the sample results. For example, an occurrence count of two would be associated with the attribute value of Houghton because it occurs in two entries of this sample result. To increase the coverage of a database, that is, the number of entries that are represented in the site-level index, the search system uses the data of the sample results to formulate new sampling queries for that database. For example, the search system may formulate a sampling query with the site publisher attribute set to Houghton, which would retrieve all entries for books published by Houghton Mifflin. The search system would then update the site-level index so that it "covered" all Houghton Mifflin books of the database thus increasing the coverage of the database. The search system may use that sampling result to generate further sampling queries. The search system, thus, generatively expands the coverage of a database based on previous sampling results of the sampling searches.

In one embodiment, the search system generates the domain-level index from the various site-level indexes. The search system adds an entry to the domain-level index for each distinct attribute value among the site-level indexes. For example, if five databases have entries for books by Tolkien then the domain-level index would have an entry for Tolkien with at least five sub-entries that each identify one of the five databases and the author site attribute of that database. When one of the databases contains an entry for the book "J. R. R. Tolkien: Architect of Middle Earth: A Biography," the entry of the domain-level index for Tolkien may also contain a sub-entry for that database that identifies the title site attribute. The domain-level index may also contain frequency information in each sub-entry that indicates frequency of that attribute value within each database. The search system may use the frequency information when selecting databases for submitting queries. In one embodiment, the search system may divide or segregate the domain-level index based on domain attributes. For example, the domain-level index may have a sub-index for the title domain attribute and another sub-index for the author domain attribute. Each of the sub-indexes would include an entry for each distinct attribute value for that attribute within the databases. The use of sub-indexes facilitates translating structured queries by allowing the search system to first select the appropriate sub-index for the attribute of the structured query and then the entry that contains the attribute value (which contains sub-entries that all correspond to the attribute), rather than first selecting the attribute value and then having to search for sub-entries that correspond to the attribute.

In one embodiment, the search system allows users to specify unstructured queries or structured queries when searching multiple databases. The search system maps an unstructured query to a series of structured queries by first identifying whether the terms of the unstructured query represent an attribute or an attribute value based on the domain-level index. For example, an unstructured query may be "title author Tolkien" when the user wants to search for books written about the author Tolkien. The search system identifies that the term title and the term author are both domain attributes because they are names of attributes within the domain schema. The search system may also identify that the terms title, author, and Tolkien are attribute values because they are attribute values within a database. The terms title and author may be attribute values because one of the databases has an entry for the book "1997 Harvard Business School Core Collection: An Author, Title, and Subject Guide." After identifying the set of attribute terms and attribute value terms, the search system generates a query for each combination of attribute term and attribute value term. For example, the search system would generate queries for the title attribute with attribute values of title, author, and Tolkien and would generate queries for the author attribute with attribute values of title, author, and Tolkien. The search system can use the attribute and attribute value pairs of a structured query directly without having to perform a mapping that is similar to that used for unstructured queries. With either unstructured queries or structured queries, the search system would translate the domain attributes to the site attributes of the selected databases. The search system then submits these queries to the databases selected based on the domain-attribute index because, for example, they are known to have entries corresponding to the attribute and attribute value of a query. The search system may also identify the order in which the queries are to be submitted based on information of the domain-attribute index. For example, the search system may elect to order the databases based on whether the domain-attribute index indicates they are likely to return a lot of entries (e.g., the frequency number indicates that a large number of entries will be returned).

Because the sampling of a database may place a heavy load on the database, the search system may use various techniques to ensure greater coverage of the database with less sampling. The search system may use various sampling criteria that may include random sampling, attribute-adaptive sampling, and value-adaptive sampling. When using random sampling, the search system randomly selects a site attribute and randomly selects an attribute value for the selected attribute that has not yet been selected. When using attribute-adaptive sampling, the search system selects a site attribute that has the smallest number of distinct attribute values among all the attributes of the databases. The search system then randomly selects an unused attribute value for that site attribute. When using value-adaptive sampling, the search system selects the site attribute that has the smallest number of distinct attribute values (like attribute-adaptive sampling), but selects an attribute value for that attribute that has not yet been selected and that has the largest number of occurrences among all attribute values that have not yet been selected. An attribute with the smallest number of distinct values within the domain-attribute index may also have a small number of distinct values in the sampled database. That is, on average a value from this attribute may have a higher chance than values from other attributes to match to a large portion of the sampled database entries. Similarly, a value with more occurrences in the domain-attribute index may also appear more frequently in the sampled database. That is, sampling the database with a value with more occurrences may retrieve a larger portion of the database entries.

In one embodiment, the search system applies a sampling stop criterion to terminate the sampling of a sampled database. Although exhaustive sampling of the database may be possible, it places a heavy burden on the database, and the database's web site may lock out users who access the database too often. The search system may use an absolute sampling stop criterion that is based on the maximum number of queries or a maximum time. Alternatively, the search system may use a relative sampling stop criterion based on the marginal value of the last few sampling queries as indicated by the amount of new content that was added to the site-level index based on the query results. The search system may use a combination of absolute and relative sampling stop criteria. For example, the search system may stop the sampling after 1000 queries or when the marginal value is below a threshold, whichever occurs first.

FIG. 1 is a block diagram that illustrates components of the search system in one embodiment. Web databases 101 are connected via a communications link 102 to a search system 110. The search system includes a generate query component 111, a formulate structured query component 112, a formulate unstructured query component 113, a generate domain-attribute index component 114, a query selection component 115, an update site-level index 116, and an update domain-level index component 117. The search system also includes a domain-attribute index 120 that includes a domain-level index 121, and, for each database, a site-level index 122. The search system also includes a correspondence table 123. The domain-level index is a value-to-attribute index that maps attribute values to databases and site attributes within the databases. The site-level index is an attribute-to-value index that maps site attributes of a database to their corresponding distinct values. The correspondence table maps the domain attributes to the site attributes of each database. One skilled in the art will appreciate that since site attributes are mapped to domain attributes, and vice versa, whenever something maps to a site attribute it can be mapped directly or indirectly via a domain attribute, and conversely for domain attributes. The generate query component receives a user query, determines whether the query is structured or unstructured, and invokes the formulate structured query component or the formulate unstructured query component as appropriate. The formulate structured query component generates queries based on the attribute and attribute values of the structured query. The formulate unstructured query component identifies attribute terms and attribute value terms of the query and generates queries based on combinations of the attribute terms and the attribute value terms. The generate query component selects databases and submits queries to those databases. The generate domain-attribute index component controls the generating of the domain-attribute index including the domain-level index and the site-level indexes. The generate domain-attribute index component invokes the query selection component to generate queries to be used for sampling the database. The generate domain-attribute index component invokes the update site-level index component to update the site-level index for a sampled database. The generate domain-attribute index component invokes the update domain-level index component to update the domain-level index based on the information of the site-level indexes.

The computing device on which the search system is implemented may include a central processing unit, memory, input devices (e.g., keyboard and pointing devices), output devices (e.g., display devices), and storage devices (e.g., disk drives). The memory and storage devices are computer-readable media that may contain instructions that implement the search system. In addition, the data structures and message structures may be stored or transmitted via a data transmission medium, such as a signal on a communications link. Various communications links may be used, such as the Internet, a local area network, a wide area network, or a point-to-point dial-up connection. One skilled in the art will appreciate that the search system can be used with databases other than web databases. For example, the databases may be databases of different organizations (e.g., companies or governmental entities) that can be searched via a metasearcher.

The search system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The search system may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments. One skilled in the art will appreciate that the illustrated data structures are just sample types of data structures that can be used to organize the data.

FIG. 2 illustrates a correspondence table in one embodiment. The correspondence table 200 (also referred to as a domain-to-site attribute mapping) maps each domain attribute 201 to the corresponding site attribute for each database. For example, row 202 of the correspondence table indicates that the author domain attribute corresponds to the author site attribute of the first database and the "au" site attribute of the second database. Row 203 indicates that the format domain attribute corresponds to the type site attribute of the first database and the format site attribute of the second database. The generation of a correspondence table is described in U.S. patent application Ser. No. 10/846,396, entitled "Method and System for Schema Matching of Web Databases" filed on May 14, 2004, which is hereby incorporated by reference.

FIG. 3 illustrates a site-level index for the domain-attribute index in one embodiment. The site-level index 300 contains an entry for each site attribute for the database of a web site. In this example, the entries for site attributes are represented by rows within the table. Each entry includes sub-entries for each distinct value within the database for that site attribute. The sub-entries may also indicate the frequency or the number of occurrences in which the attribute value was found when sampling the database. For example, the entry for the author site attribute has a sub-entry for the attribute value of Rowling and another sub-entry for the attribute value of Tolkien. The entry for the title site attribute includes a sub-entry for the attribute value of sorcerer and a sub-entry for the attribute value of ring.

FIG. 4 illustrates a domain-level index for the domain-attribute index in one embodiment. The domain-level index 400 includes an entry for each distinct attribute value within the site-level indexes and sub-entries that map the attribute value to the databases and site attributes that contained that value. In this example, entry 401 corresponds to the attribute value of Tolkien and has sub-entries that indicate that the Tolkien attribute value is found within the title site attribute of the first database, the author site attribute of the first database, and the title site attribute of the second database. Entry 402 corresponds to the attribute value of Houghton and has sub-entries that indicate that the Houghton attribute value is found within the publisher site attribute of the first database, the publisher site attribute of the second database, the author site attribute of the second database, and the title site attribute of the second database.

Figure 5:
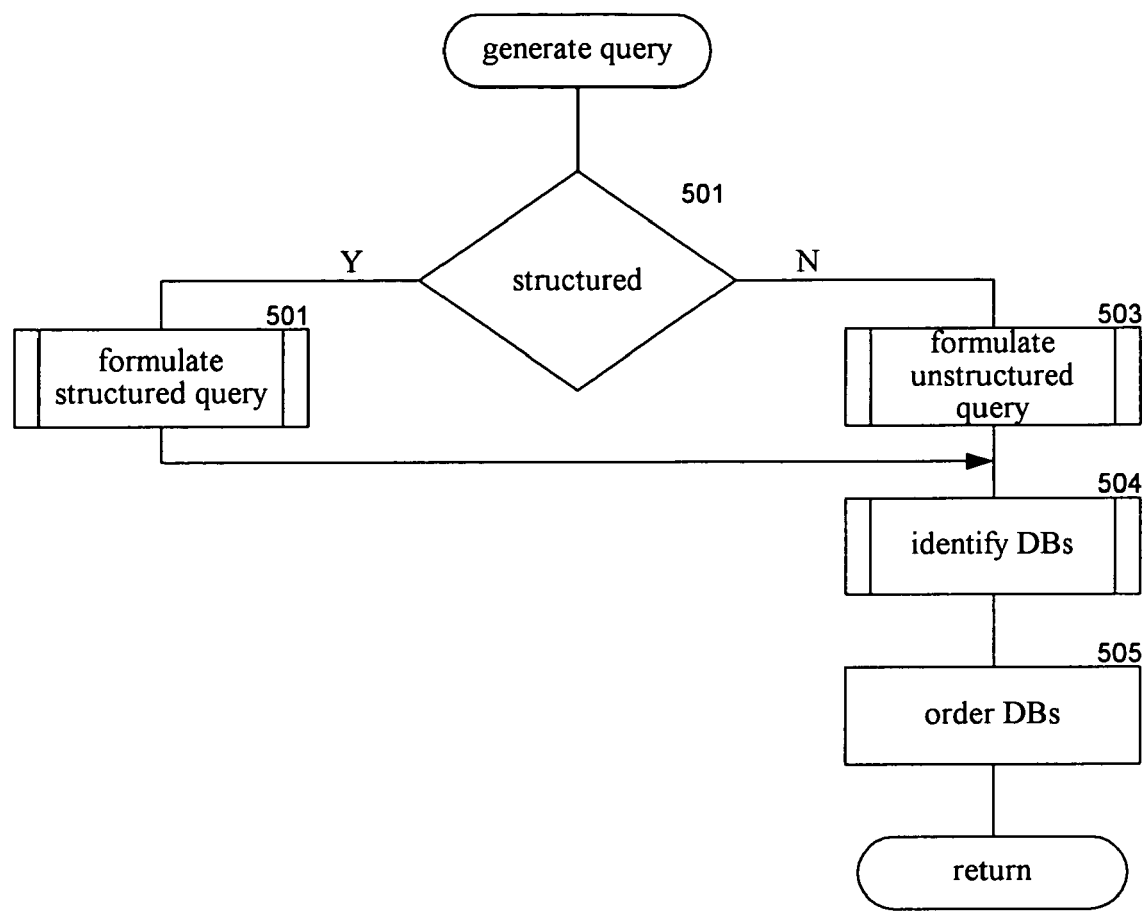
FIG. 5 is a flow diagram that illustrates the processing of the generate query component in one embodiment.

FIG. 5 is a flow diagram that illustrates the processing of the generate query component in one embodiment. The component is passed a query that may be structured or unstructured and generates queries to be submitted to the various databases. In decision block 501, if the passed query is structured, the component continues at block 502, else the component continues at block 503. In block 502, the component invokes the formulate structured query component to generate the queries for the databases. In block 503, the component invokes a formulate unstructured query component to formulate queries from the unstructured query. In block 504, the component invokes a select database component to select databases to which the queries should be submitted. The component may also translate the queries from the domain attributes to the site attributes of the selected databases. In block 505, the component orders the databases so that the queries can be submitted in an order that may generate the most desirable results sooner. For example, the databases may be ordered based on which databases may have the most entries related to a certain attribute value. The component may also combine queries for a database by combining the attribute and attribute values by a logical-OR. The component then completes.

Figure 6:
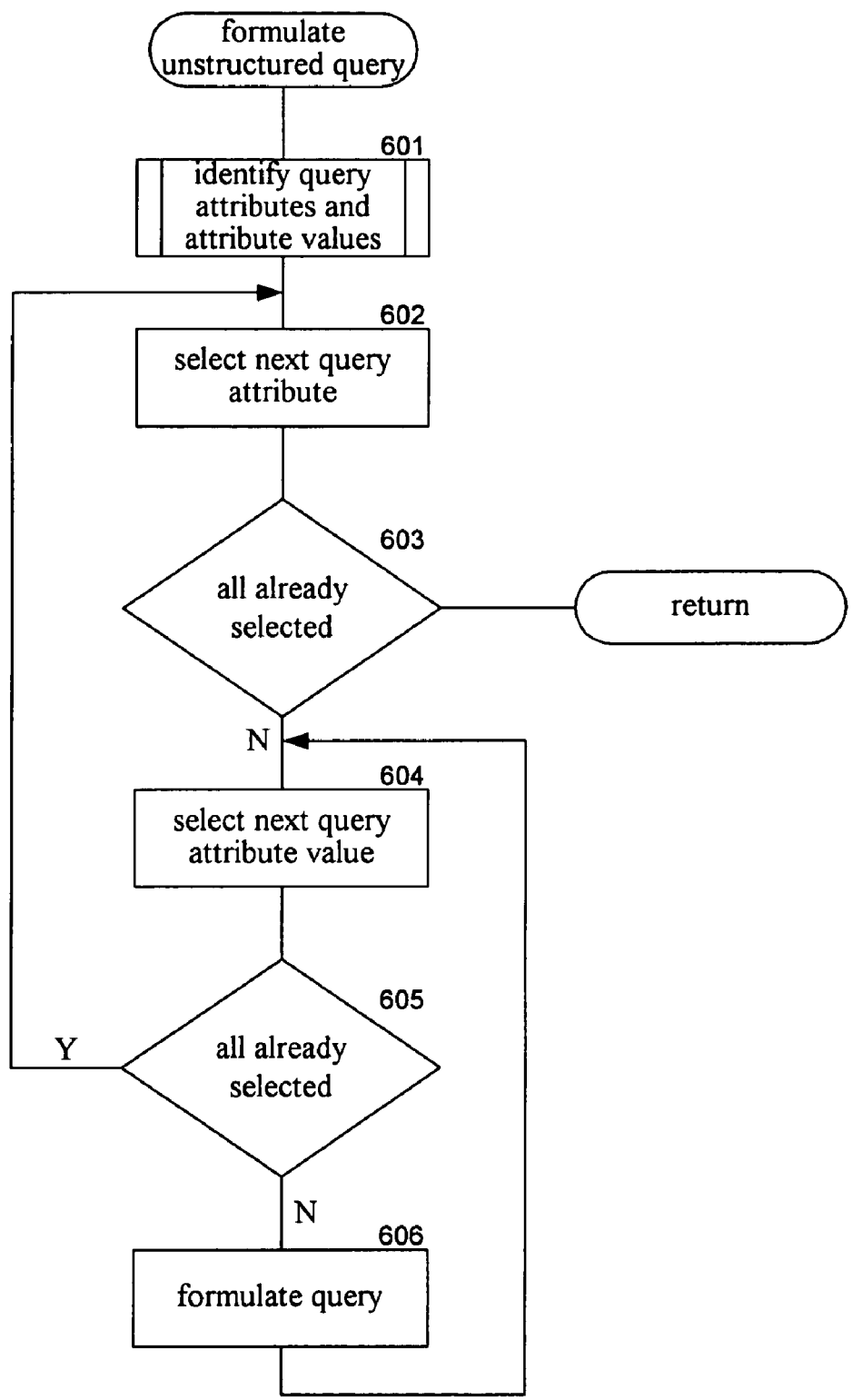
FIG. 6 is a flow diagram that illustrates the processing of the formulate unstructured query component in one embodiment.

FIG. 6 is a flow diagram that illustrates the processing of the formulate unstructured query component in one embodiment. In block 601, the component invokes a component to identify from the query the attribute terms and the attribute value terms. In blocks 602–606, the component loops selecting attribute term and attribute value term pairs and formulates a query for the pair. In block 602, the component selects the next attribute term. In decision block 603, if all the attribute terms have already been selected, then the component returns, else the component continues at block 604. In block 604, the component selects the next attribute value term. In decision block 605, if all the attribute value terms have already been selected, then the component loops to block 602 to select the next attribute term, else the component continues at block 606. In block 606, the component formulates a query by setting the domain attribute corresponding to the selected attribute term to the selected attribute value term. The component then loops to block 604 to select the next attribute value term.

Figure 7:
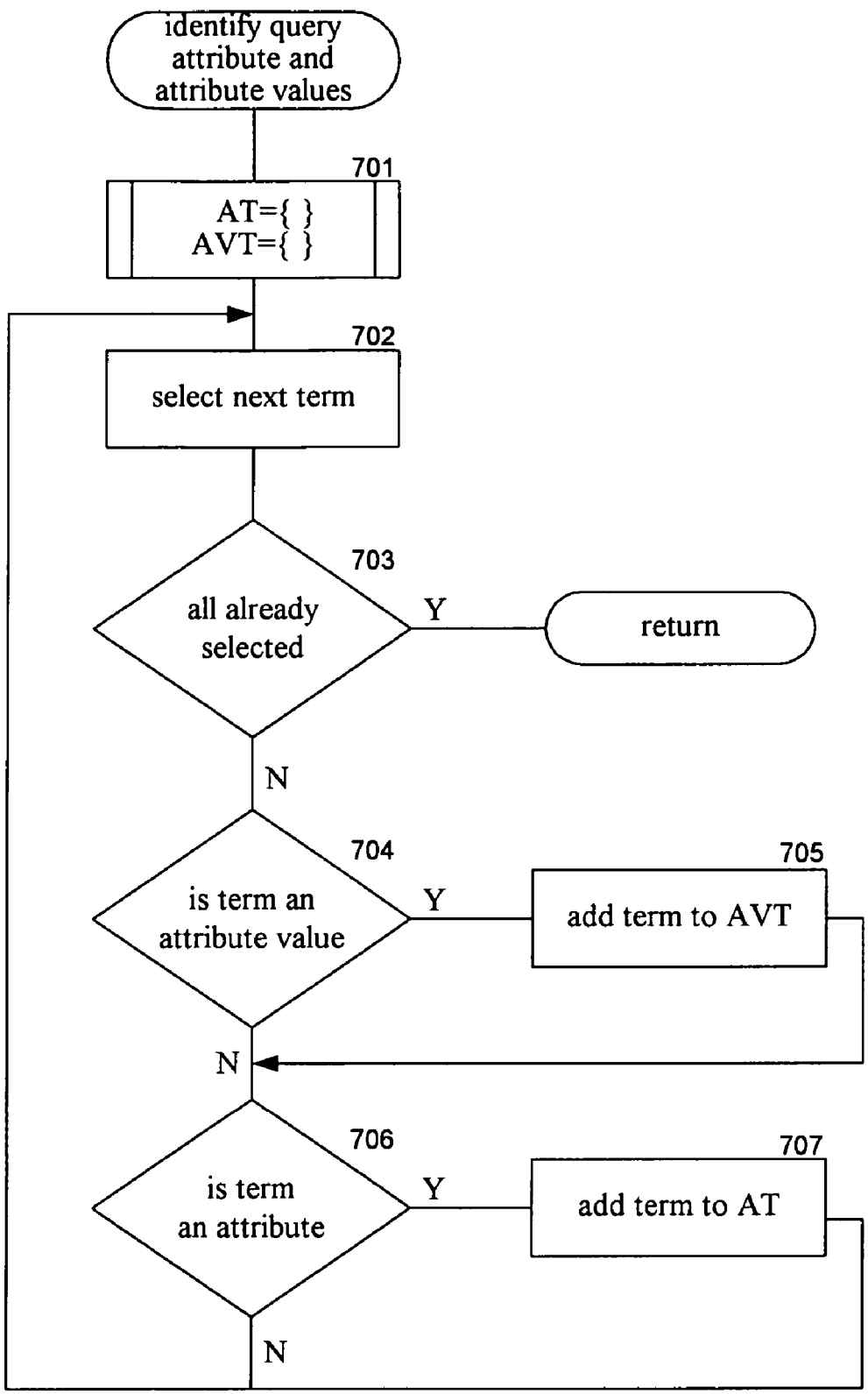
FIG. 7 is a flow diagram that illustrates the processing of a component that identifies attribute terms and attribute value terms of a query in one embodiment.

FIG. 7 is a flow diagram that illustrates the processing of a component that identifies attribute terms and attribute value terms of a query in one embodiment. In block 701, the component initializes a list of attribute terms and a list of attribute value terms to empty. In blocks 702–707, the component loops selecting each term of the query and determining whether it is an attribute term, an attribute value term, or both. In block 702, the component selects the next term of the query. In decision block 703, if all the terms of the query have already been selected, then the component returns, else the component continues at block 704. In decision block 704, if the selected term is an attribute value term, then the component continues at block 705, else the component continues at block 706. A term is an attribute value term when the term is in an entry of the domain-level index. In block 705, the component adds the selected term to the list of attribute value terms and then continues at block 706. In decision block 706, if the selected term is an attribute, then the component continues at block 707, else the component loops to block 702 to select the next term of the query. A term is an attribute term when the term is in a sub-entry within any one of the entries of the domain-level index. In block 707, the component adds the selected term to the list of attribute terms and then loops to block 702 to select the next term of the query.

Figure 8:
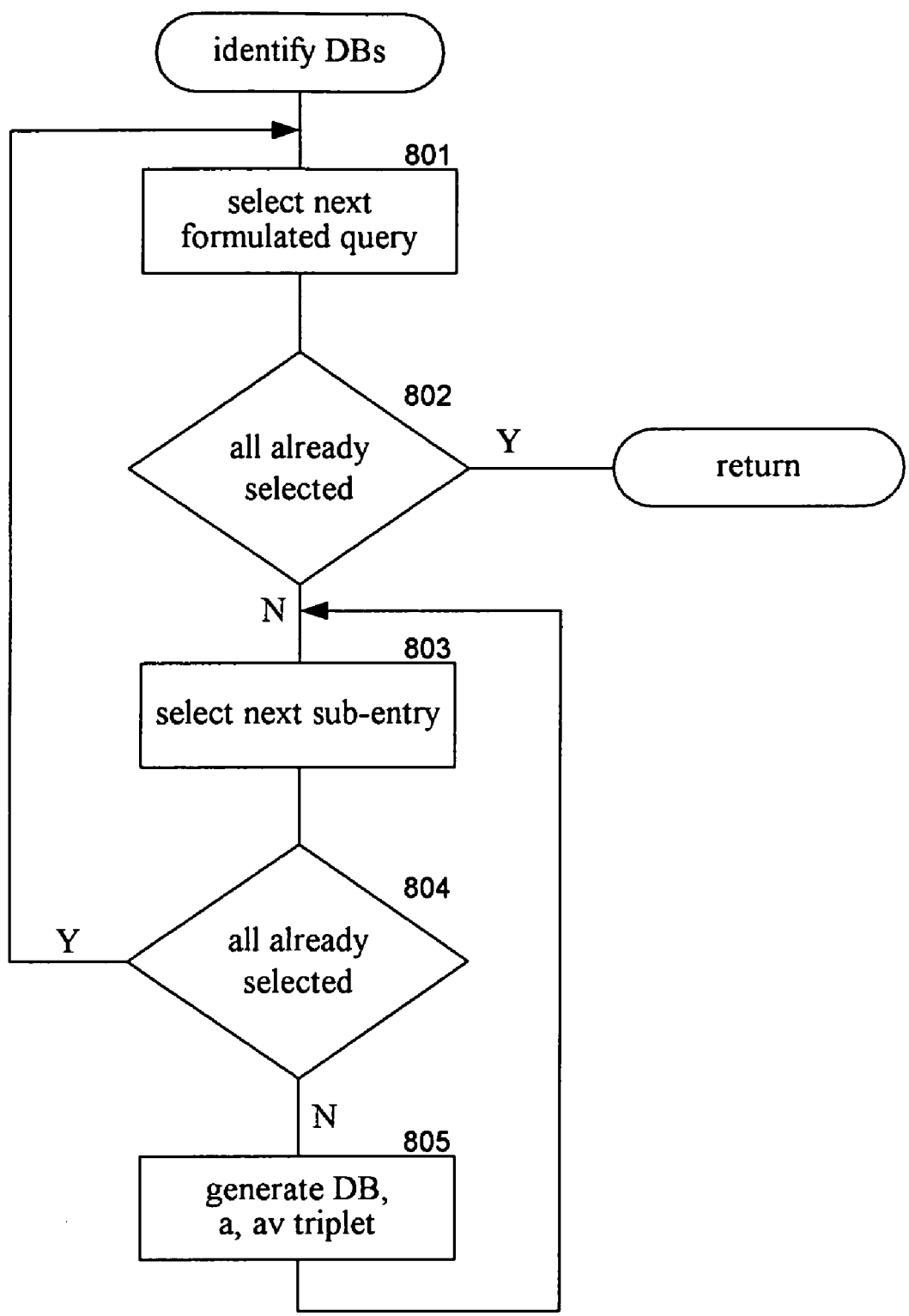
FIG. 8 is a flow diagram that illustrates the processing of a component to select databases for submitting queries in one embodiment.

FIG. 8 is a flow diagram that illustrates the processing of a component to select databases for submitting queries in one embodiment. The component selects databases based on whether that database is within a sub-entry of an entry for the attribute value of the query within the domain-level index. In block 801, the component selects the next formulated query. In decision block 802, if all the queries have already been selected, then the component returns, else the component continues at block 803. In block 803, the component selects a sub-entry within the entry for the attribute of the selected query. In decision block 804, if all such sub-entries have already been selected, the component loops to block 801 to select the next query, else the component continues at block 805. In block 805, the component generates a database, attribute, and attribute value triplet for the query and then loops to block 803 to select the next sub-entry. A triplet indicates a query to be submitted to the database. The component may also translate the domain attribute to the corresponding site attribute of the database.

Figure 9:
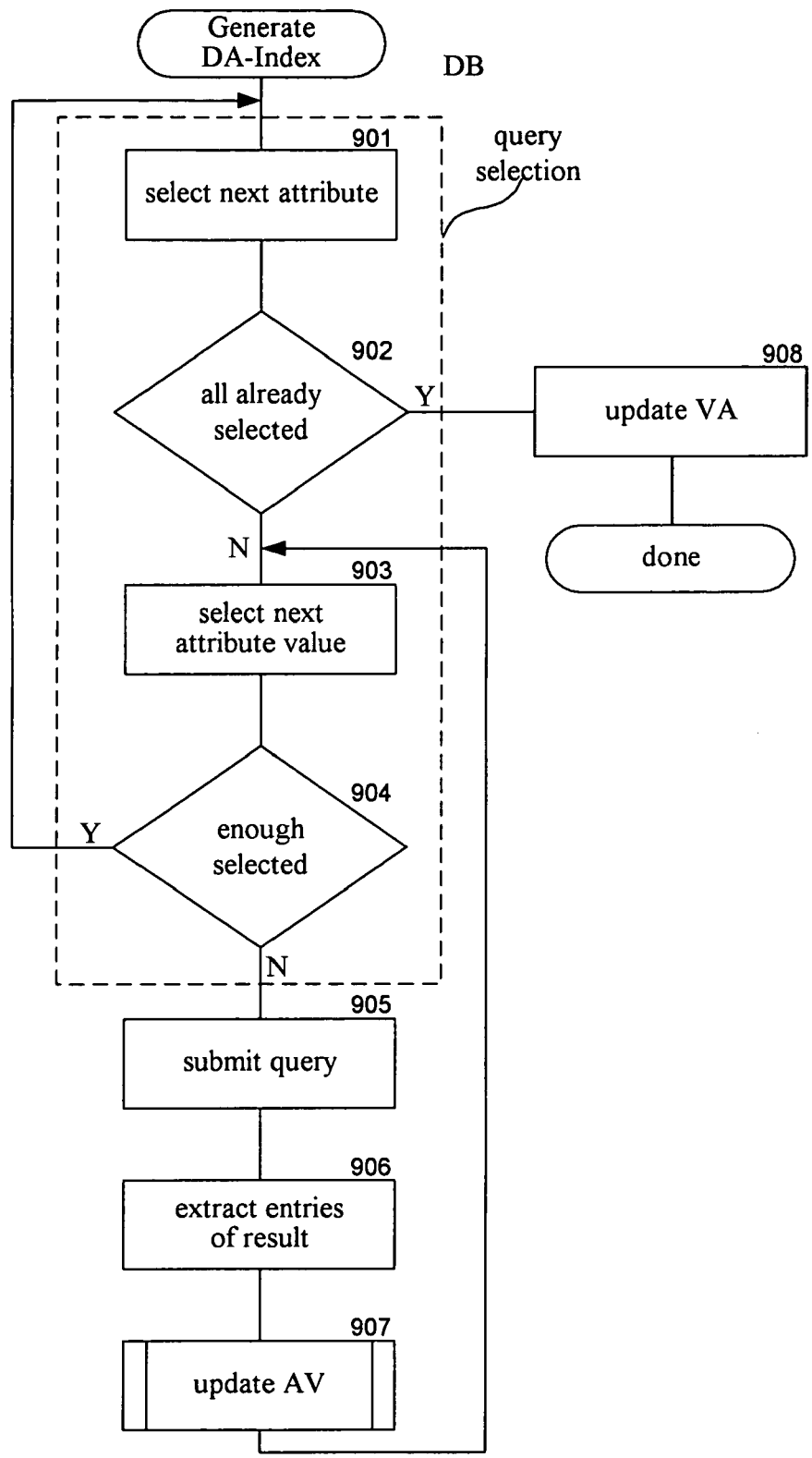
FIG. 9 is a flow diagram that illustrates the processing of the generate domain-attribute index component in one embodiment.

FIG. 9 is a flow diagram that illustrates the processing of the generate domain-attribute index component in one embodiment. In this embodiment, the component exhaustively generates queries for all attribute and attribute value combinations and randomly selects attribute and attribute values. Blocks 901–904 may be replaced by a component that implements a different sampling criterion (e.g., attribute-adaptive sampling) and a sampling stop criterion. In block 901, the component selects the next domain attribute. In decision block 902, if all the domain attributes have already been selected, then the component continues at block 980, else the component continues at 903. In block 903, the component selects the next attribute value. In decision block 904, if all the attribute values have already been selected, then the component continues at block 901, else the component continues at block 905. In block 905, the component submits a sampling query based on the selected domain attribute (mapped to the corresponding site attribute) and the selected attribute value. In block 906, the component extracts entries of the sampling result. For example, the component may extract only the first 10 entries or some other number of entries. In block 907, the component invokes the update site-level index component to update the site-level index for the sampled database. The component then loops to block 903 to select the next attribute value for the selected domain attribute. In block 908, the component invokes the update domain-level index to update the domain-level index based on the updated site-level indexes.

Figure 10:
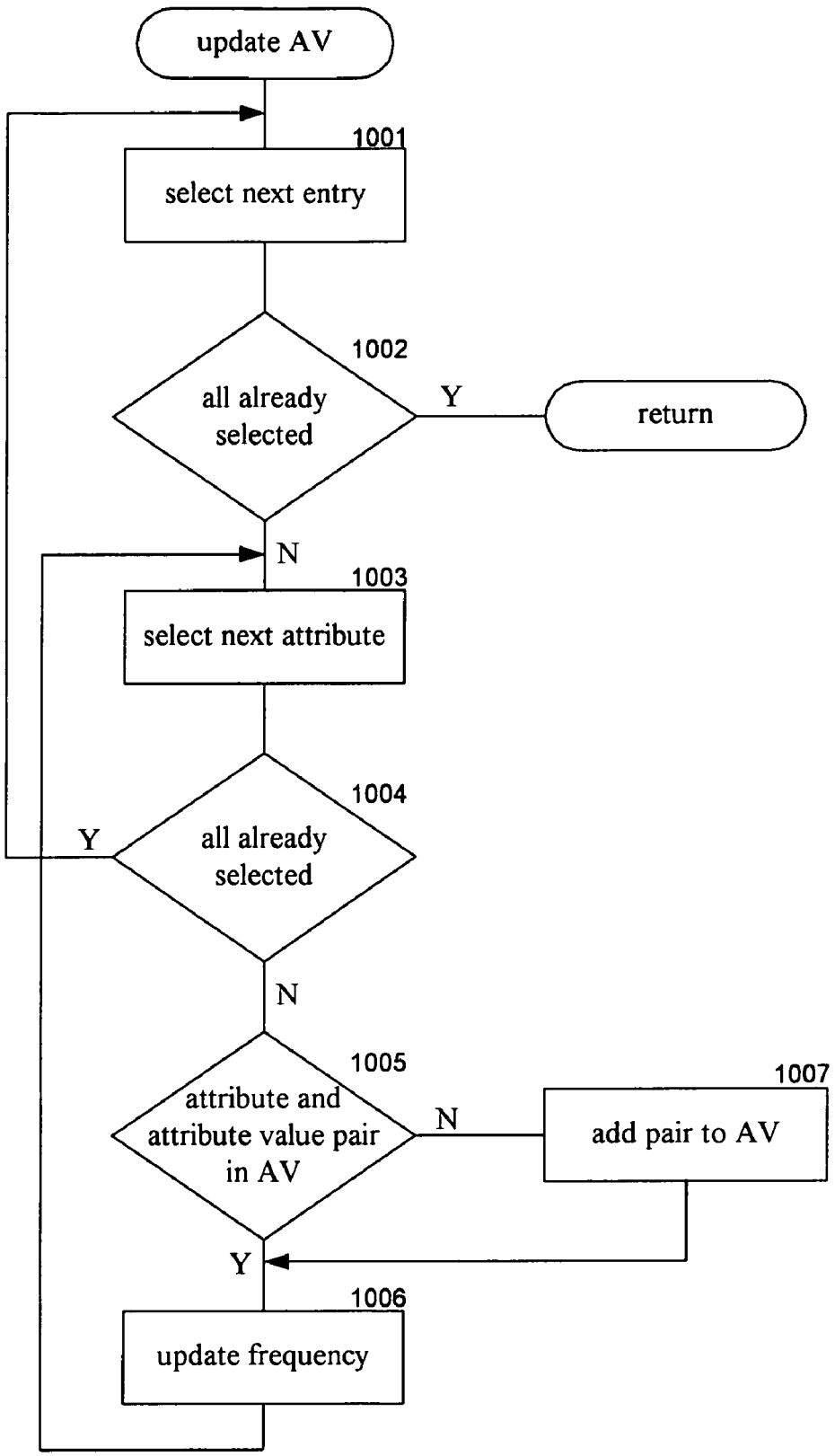
FIG. 10 is a flow diagram that illustrates the processing of the update site-level index component in one embodiment.

FIG. 10 is a flow diagram that illustrates the processing of the update site-level index component in one embodiment. The component is passed a sampling result, selects each attribute and attribute value pair within the sampling result, and determines whether the pair is in the site-level index. If not, the component adds the pair to the index. Otherwise, the component updates the frequency for the existing pair. In block 1001, the component selects the next entry of the sampling result. In decision block 1002, if all the entries have already been selected, then the component returns, else the component continues at block 1003. In block 1003, the component selects the next attribute of the selected entry. In decision block 1004, if all the attributes of the selected entry have already been selected, the component loops to block 1001 to select the next entry, else the component continues at block 1005. In decision block 1005, if the selected attribute and its attribute value are already a pair in the site-level index, then the component continues at block 1006, else the component continues at block 1007. In block 1007, the component adds the attribute and attribute value pair to the site-level index and then continues at block 1006. In block 1006, the component updates the frequency for the attribute and attribute value pair in the site-level index and then loops to block 1003 to select the next attribute for the selected entry of the sampling result.

One skilled in the art will appreciate that although specific embodiments of the search system have been described herein for purposes of illustration, various modifications may be made without deviating from the spirit and scope of the invention. Accordingly, the invention is not limited except by the appended claims.

We claim:

1. A method in a computer system for searching web databases, the method comprising:
   providing of mapping of attribute and attribute value pairs to web databases that contain the attribute and attribute value pairs, the mapping being generated by sampling the web databases;
   receiving an unstructured query having terms;
   identifying, from the unstructured query, terms that are attribute terms that correspond to an attribute of a web database;
   identifying, from the unstructured query, terms that are attribute value terms that correspond to an attribute value of a web database;
   for each pair of identified attribute terms and identified attribute value terms,
   formulating a query with an attribute corresponding to the identified attribute term set to the identified attribute value term; and
   when the mapping indicates that a web database has an attribute and an attribute value pair that corresponds to the pair of the identified attribute term and the identified attribute value term used to formulate the query, submitting the formulated query to the web database.

2. The method of claim 1 wherein the mapping is a domain-attribute index.

3. The method of claim 2 wherein the domain-attribute index provides, for a plurality of attribute values, each contained within at least one attribute of one entry of one web database, a mapping from the attribute value to a web database and attribute of that web database that contains that attribute value in that attribute of an entry of that web database.

4. The method of claim 2 wherein the domain-attribute index provides, for each web database and for each attribute within that web database, a mapping to distinct attribute values that are contained within that attribute of an entry within that database.

5. The method of claim 2 wherein the domain-attribute index includes a domain-level index and a site-level index.

6. A method in a computer system for searching web databases, the method comprising:
receiving pairs of attributes and attribute values;
formulating a query for each received pair;
identifying web databases to submit the formulated queries using a domain-attribute index, the domain-attribute index providing, for a plurality of attribute values, each contained within at least one attribute of one entry of one web database, a mapping from the attribute value to a web database and attribute of that web database that contains that attribute value in that attribute of an entry of that web database, the mapping being generated by sampling the web databases by submitting queries to the web databases with various combinations of attribute and attribute value pairs; and
submitting the formulated queries to the identified web databases.

7. The method of claim 6 wherein the domain-attribute index includes a domain-level index and a site-level index.

8. A method in a computer system for sampling databases within a domain, the method comprising:
providing sets of attribute values for attributes of the domain (See e.g. col. 1, lines 58–59, 'means for storing a value based index of selected attributes'); and
for each of a plurality of databases to sample,
for each of a plurality of attribute and an-attribute value pairs selected from the provided sets,
submitting a query to the database that queries the selected attribute of the pair with the attribute value of the pair, wherein the submitted query generates a result; and
generating a mapping between the attributes of the database and attribute values when the result indicates that the database contains the attribute and the attribute value pair of the submitted query.

9. The method of claim 8 including updating the sets of attribute values for attributes of the domain based on the result so that an attribute value from an updated set can be used when a query is next submitted.

10. The method of claim 8 wherein the generated mapping is a domain-attribute index.

11. The method of claim 10 wherein the generated mapping is a site-level index.

12. The method of claim 10 wherein the generated mapping is a domain-level index.

13. The method of claim 8 wherein an attribute is selected that has the smallest number of distinct attribute values.

14. The method of claim 8 wherein an attribute value is selected that has the largest number of occurrences among attribute values that have not yet been selected.

15. The method of claim 8 including providing a correspondence table that maps a domain attribute to database-specific attributes for the databases.

16. The method of claim 15 wherein the submitting of a query includes using the correspondence table to determine for a domain attribute a database-specific attribute for the database to which the query is to be submitted.

17. The method of claim 15 including generating a mapping for each database that maps database-specific attributes of the database to attribute values contained in the database.

18. A computer system for generating a mapping between attribute values and databases having attributes with the attribute values, the databases being in a domain, comprising:
a component that provides attributes and attribute values for the domain;
a component that, for each of a plurality of pairs of provided attributes and provided attribute values, submits to each database a query for querying the attribute of the pair for the attribute value of the pair and that receives a result of each submitted query; and
a component that generates from the received results a mapping that indicates which databases contain which attribute values for which attributes.

19. The computer system of claim 18 wherein the component that generates the mapping maps each attribute value to the databases and attributes of the databases that contain the attribute value.

20. The computer system of claim 18 wherein the component that generates the mapping maps each attribute of a database to the attribute values of that attribute contained within the database.

21. The computer system of claim 18 including a component that receives a query, identifies an attribute and attribute value of the received query, identifies from the mapping databases that contain the identified attribute with the identified attribute value, and submits queries for the identified attribute with identified attribute value to the identified databases.

22. The computer system of claim 18 including a component that adds new attributes and attribute values to the provided attributes and provided attribute values based on the results so that a new attribute and a new attribute value can be used when a query is next submitted.

23. The computer system of claim 18 wherein the plurality of pairs of provided attributes and provided attribute values are selected randomly.

24. The computer system of claim 18 wherein a provided attribute is selected that has the smallest number of distinct provided attribute values.

25. The computer system of claim 18 wherein a provided attribute value is selected that has the largest number of occurrences among provided attribute values that have not yet been selected.

26. The computer system of claim 18 including a correspondence table that maps a domain attribute to database-specific attributes for the databases.

27. The computer system of claim 26 wherein the component that submits a query uses the correspondence table to determine for a domain attribute a database-specific attribute for the database to which the query is to be submitted.

* * * * *